(12) United States Patent
You et al.

(10) Patent No.: US 11,036,093 B2
(45) Date of Patent: Jun. 15, 2021

(54) METHOD OF MANUFACTURING AN OPTICAL DEVICE

(71) Applicant: LG Chem, Ltd., Seoul (KR)

(72) Inventors: Jung Sun You, Daejeon (KR); Sung Joon Min, Daejeon (KR); Dong Hyun Oh, Daejeon (KR); Jin Hong Kim, Daejeon (KR); Jung Woon Kim, Daejeon (KR); Eun Jung Lim, Daejeon (KR)

(73) Assignee: LG Chem, Ltd.

( * ) Notice: Subject to any disclaimer, the term of this patent is extended or adjusted under 35 U.S.C. 154(b) by 119 days.

(21) Appl. No.: 15/754,023

(22) PCT Filed: Sep. 8, 2016

(86) PCT No.: PCT/KR2016/010084
§ 371 (c)(1),
(2) Date: Feb. 21, 2018

(87) PCT Pub. No.: WO2017/043882
PCT Pub. Date: Mar. 16, 2017

(65) Prior Publication Data
US 2018/0246361 A1 Aug. 30, 2018

(30) Foreign Application Priority Data

Sep. 8, 2015 (KR) .......................... 10-2015-0126802

(51) Int. Cl.
*G02F 1/1339* (2006.01)
*G02F 1/1333* (2006.01)
(Continued)

(52) U.S. Cl.
CPC ........ *G02F 1/13394* (2013.01); *G02F 1/1337* (2013.01); *G02F 1/133345* (2013.01);
(Continued)

(58) Field of Classification Search
CPC ................................................. G02F 1/133377
See application file for complete search history.

(56) References Cited

U.S. PATENT DOCUMENTS

| 6,049,370 A | 4/2000 | Smith, Jr. et al. |
| 6,294,398 B1 * | 9/2001 | Kim ..................... H01L 27/3281 257/40 |

(Continued)

FOREIGN PATENT DOCUMENTS

| CN | 1399800 A | 2/2003 |
| CN | 1826688 A | 8/2006 |

(Continued)

OTHER PUBLICATIONS

Search report from International Application No. PCT/KR2016/010084, dated Dec. 1, 2016.

(Continued)

*Primary Examiner* — Alexander P Gross
(74) *Attorney, Agent, or Firm* — Lerner, David, Littenberg, Krumholz & Mentlik, LLP

(57) ABSTRACT

The present application relates to a method of manufacturing an optical device, an optical device and a use of the optical device. The method of manufacturing an optical device of the present application can form a patterned mold layer to maintain an appropriate gap between the upper and lower substrates, and can apply an imprinting process in patterning the mold layer to simply manufacture the mold pattern having the desired shape. In addition, the optical device manufactured by the above manufacturing method can have a low driving voltage and no short circuit phenomenon, and be realized as a flexible device. Such an optical device can be applied to various display devices such as LCDs.

13 Claims, 11 Drawing Sheets

(51) Int. Cl.
*G02F 1/1337* (2006.01)
*G02F 1/1343* (2006.01)

(52) U.S. Cl.
CPC .... *G02F 1/133377* (2013.01); *G02F 1/13439* (2013.01); *G02F 1/133305* (2013.01); *G02F 1/133742* (2021.01); *G02F 2202/28* (2013.01)

(56) References Cited

U.S. PATENT DOCUMENTS

| | | |
|---|---|---|
| 2002/0094594 A1 | 7/2002 | Kim et al. |
| 2005/0151909 A1 | 7/2005 | Yagi et al. |
| 2006/0014320 A1 | 1/2006 | Yamano et al. |
| 2006/0197892 A1 | 9/2006 | Fujiwara et al. |
| 2008/0020007 A1* | 1/2008 | Zang ............... A61K 8/0295 424/401 |
| 2009/0079706 A1 | 3/2009 | Mishima et al. |
| 2009/0180172 A1* | 7/2009 | Murakami ............ G02F 1/167 359/296 |
| 2009/0284707 A1* | 11/2009 | Cho ................ G02F 1/134363 349/160 |
| 2011/0013259 A1 | 1/2011 | Murakami |
| 2012/0008191 A1 | 1/2012 | Lim et al. |
| 2013/0063691 A1* | 3/2013 | Takama ............. G02F 1/13394 349/143 |
| 2013/0188117 A1* | 7/2013 | Itou ..................... G02F 1/1337 349/106 |
| 2013/0248868 A1 | 9/2013 | Jung et al. |
| 2013/0293944 A1 | 11/2013 | Hayashi et al. |
| 2013/0299808 A1 | 11/2013 | Sugimoto et al. |
| 2013/0323997 A1* | 12/2013 | Yamamoto ......... G02F 1/13439 445/49 |
| 2014/0000938 A1 | 1/2014 | Yoo et al. |
| 2014/0118641 A1 | 5/2014 | Ryu et al. |
| 2014/0240211 A1* | 8/2014 | Campisi ................ G09G 3/344 345/107 |
| 2015/0014735 A1 | 1/2015 | Moon |
| 2015/0042912 A1* | 2/2015 | Higano ............ G02F 1/133707 349/41 |

FOREIGN PATENT DOCUMENTS

| | | |
|---|---|---|
| CN | 102969344 A | 3/2013 |
| CN | 104282815 A | 1/2015 |
| JP | S61235814 A | 10/1986 |
| JP | H07507405 A | 8/1995 |
| JP | H1197173 A | 4/1999 |
| JP | 2002006297 A | 1/2002 |
| JP | 2002014378 A * | 1/2002 |
| JP | 2002014378 A | 1/2002 |
| JP | 2004251950 A | 9/2004 |
| JP | 2005208583 A | 8/2005 |
| JP | 2006243472 A | 9/2006 |
| JP | 2009128462 A | 6/2009 |
| JP | 2009237434 A | 10/2009 |
| JP | 2010102002 A | 5/2010 |
| JP | 2013033125 A | 2/2013 |
| JP | 2013235063 A | 11/2013 |
| JP | 2014089427 A | 5/2014 |
| JP | 2015135530 A | 7/2015 |
| KR | 20080028694 A | 4/2008 |
| KR | 20090032001 A | 3/2009 |
| KR | 20100026234 A | 3/2010 |
| KR | 20120018059 A | 2/2012 |
| KR | 20140001504 A | 1/2014 |
| WO | 2012108142 A1 | 8/2012 |

OTHER PUBLICATIONS

Jang, Se-Jin, et al., "Tight Bonding of Two Plastic Substrates for Flexible LCDs." SID Symposium Digest, vol. 38, May 2007, pp. 653-656.
Chinese Search Report for Application No. 2016800513476 dated May 19, 2020, 2 pages.

* cited by examiner

[Figure 1]
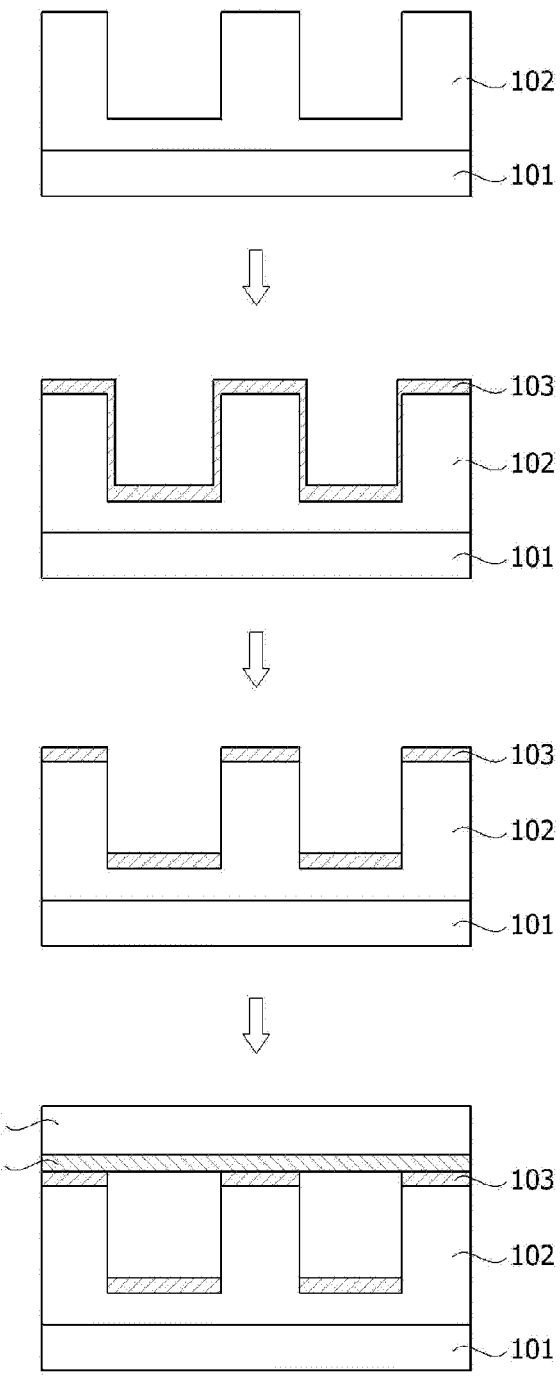

[Figure 2]
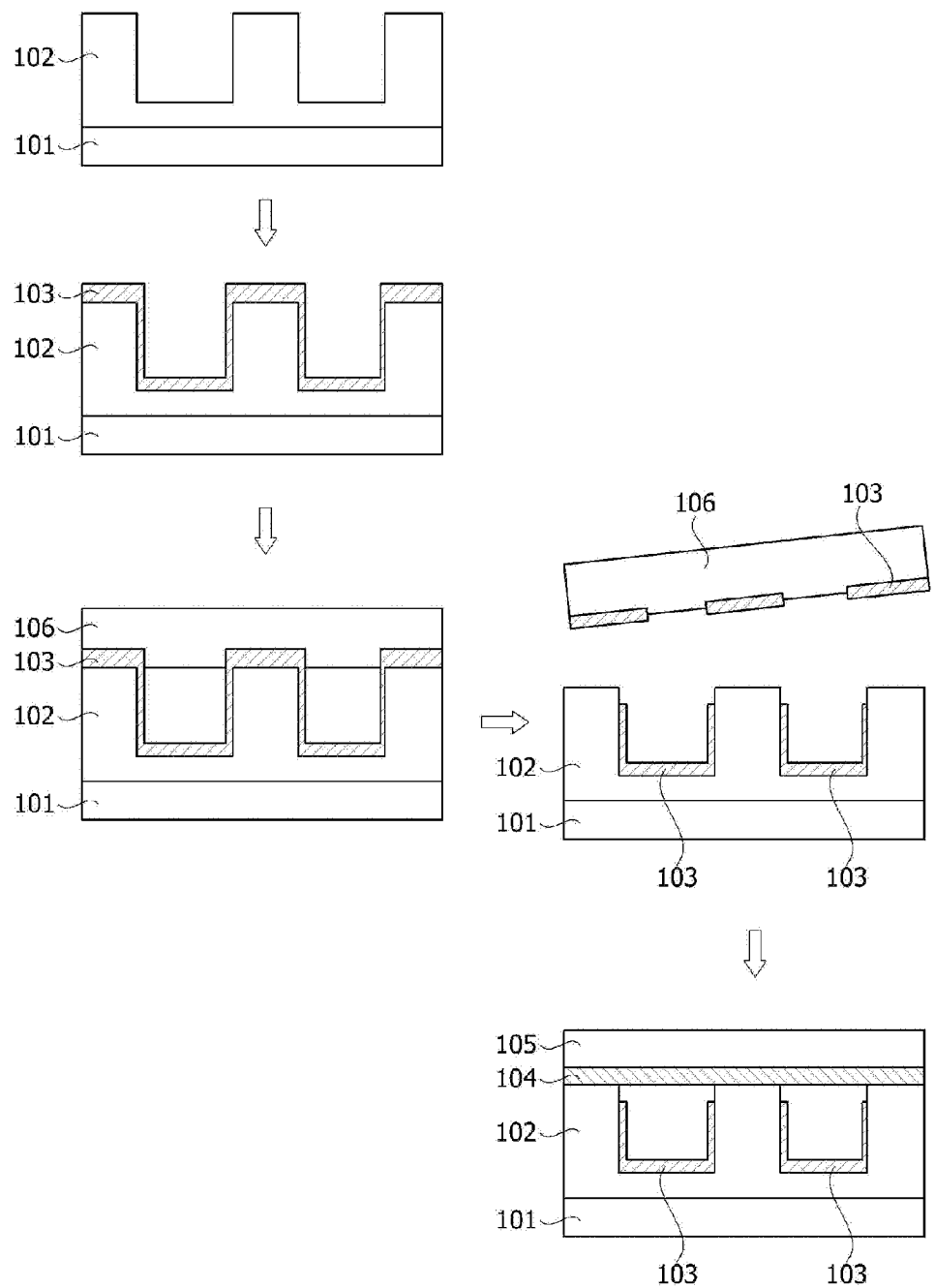

[Figure 3]
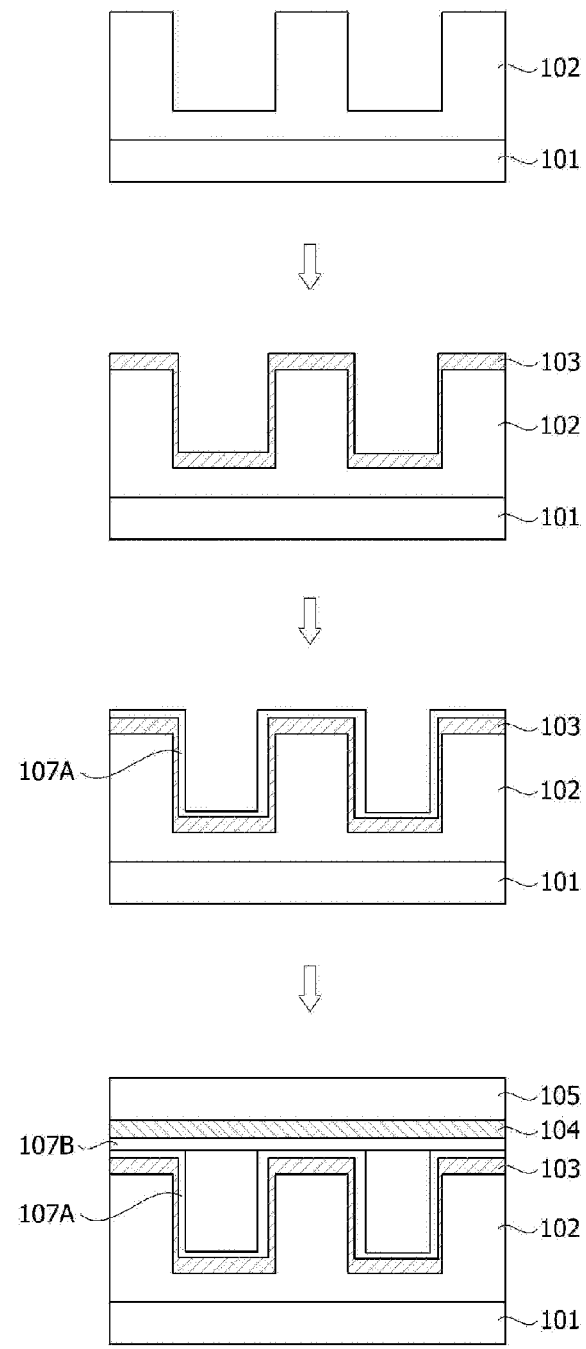

[Figure 4]
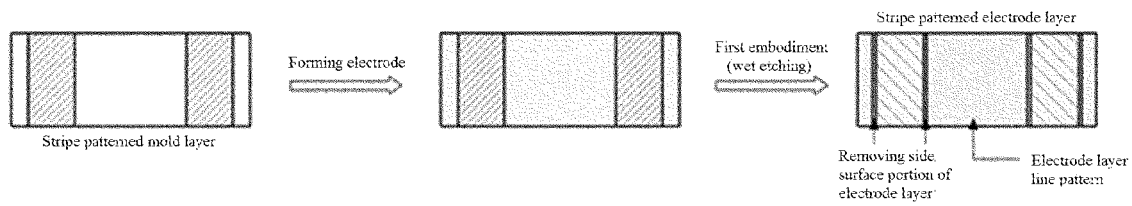
[Figure 5]
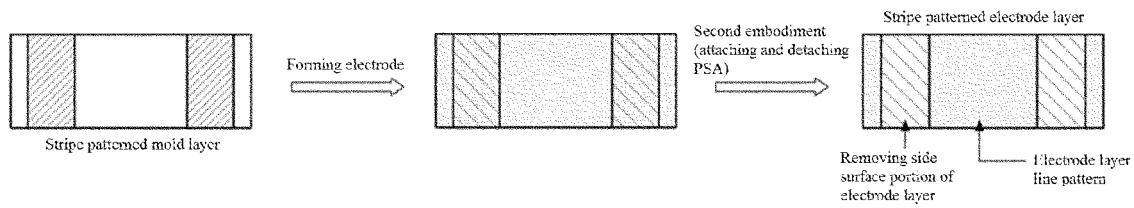
[Figure 6]
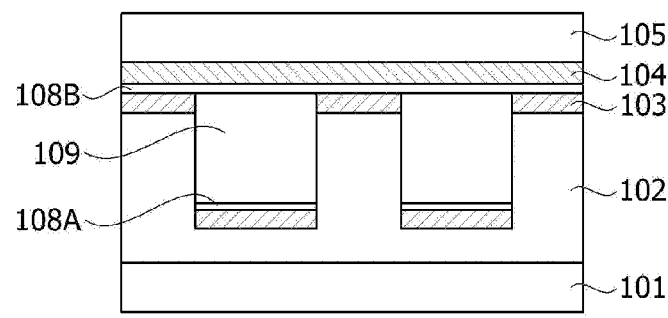

[Figure 7]
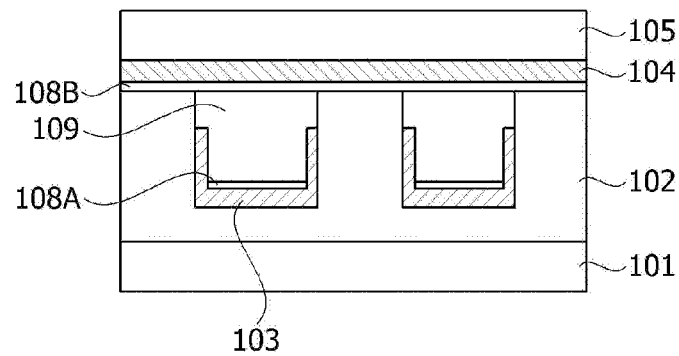
[Figure 8]
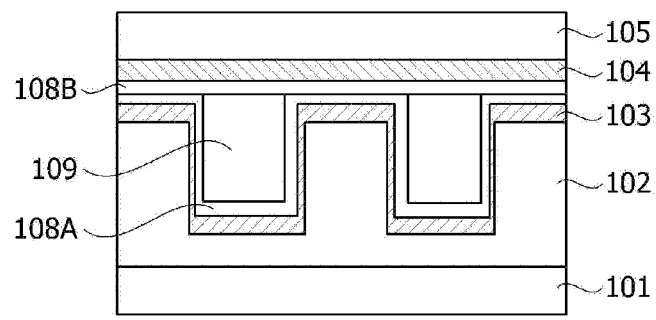
[Figure 9]
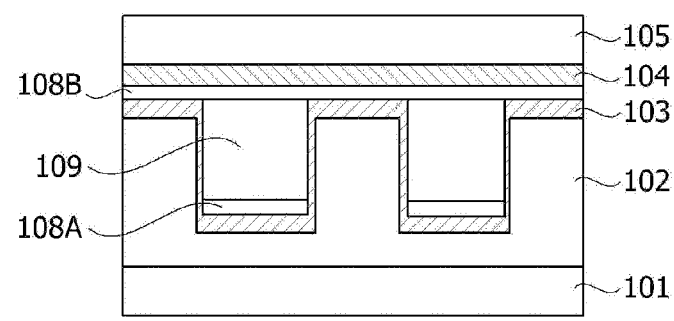

[Figure 10]
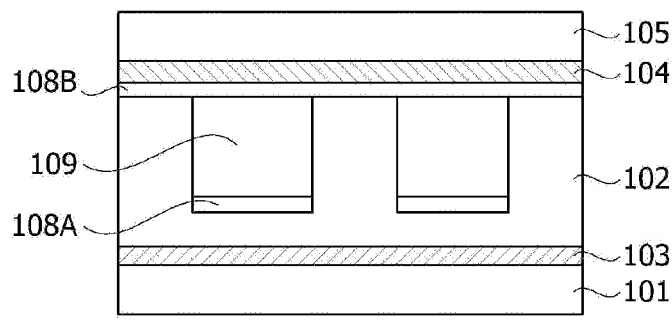
[Figure 11]
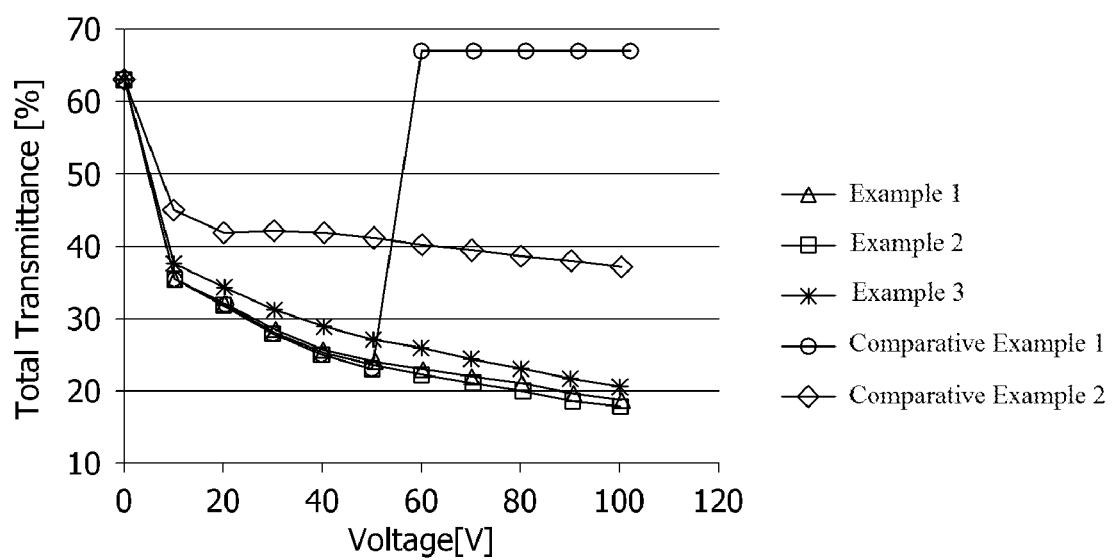

[Figure 12]
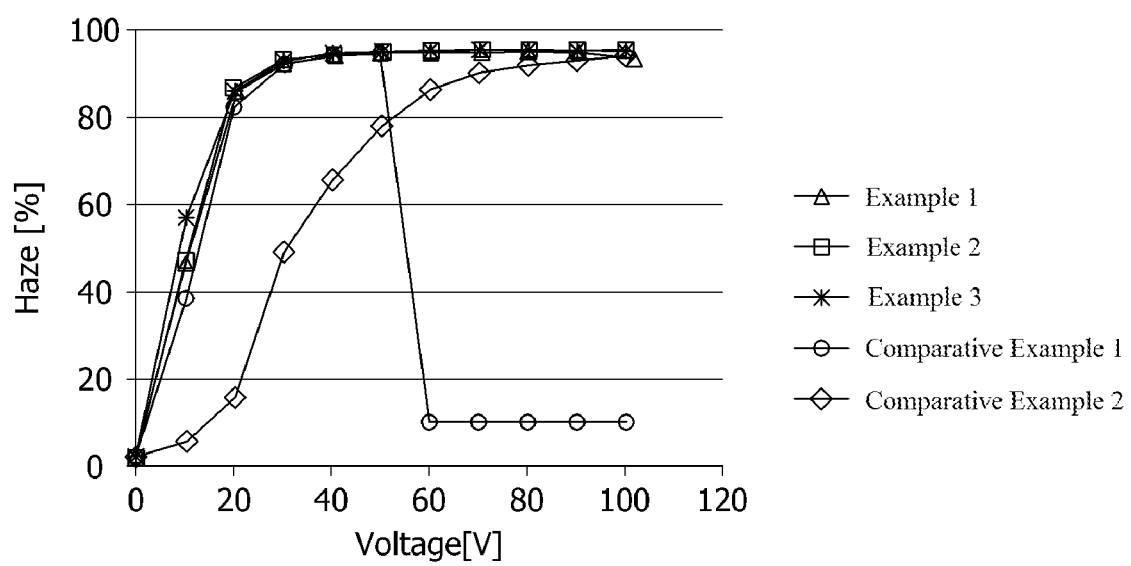

[Figure 13]
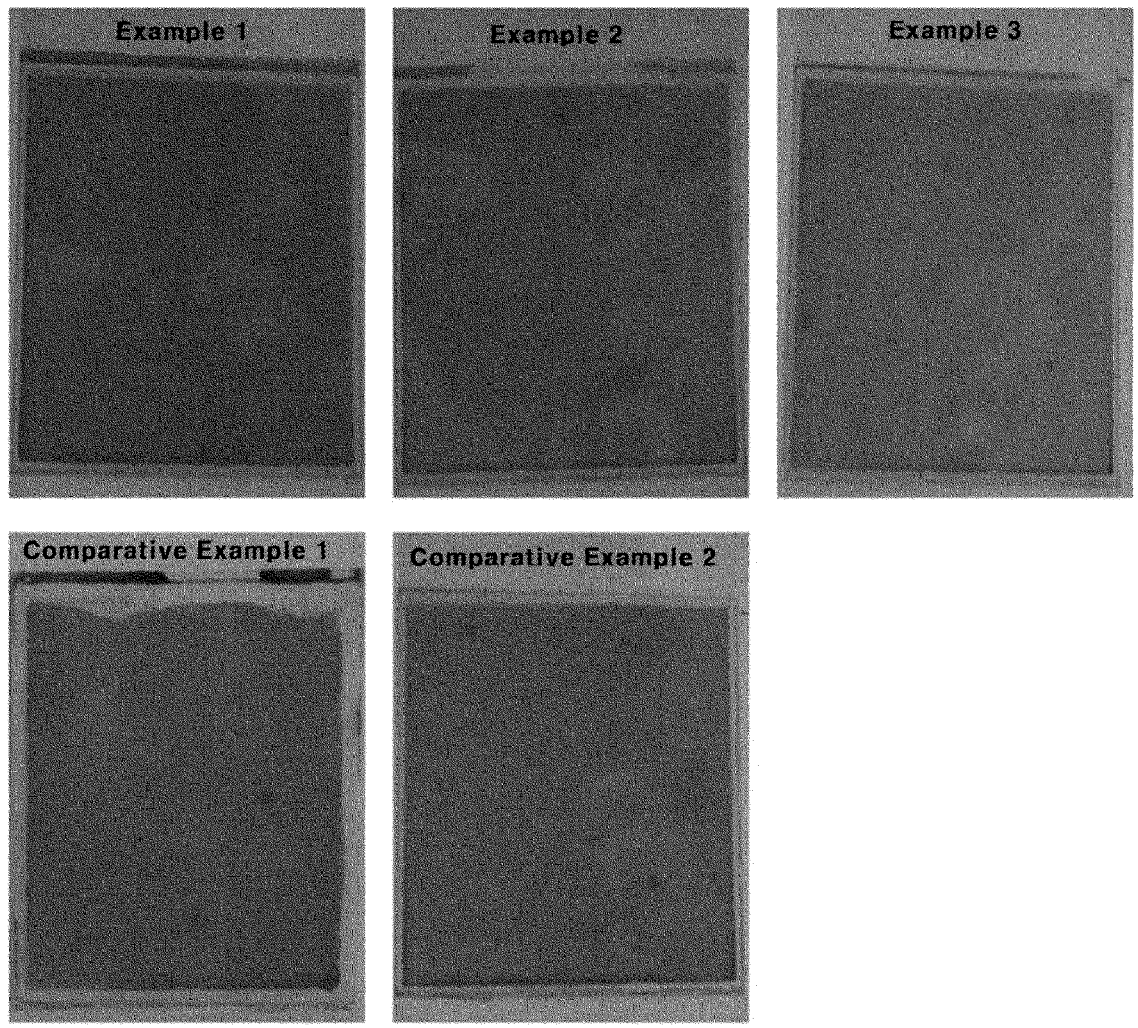

[Figure 14]
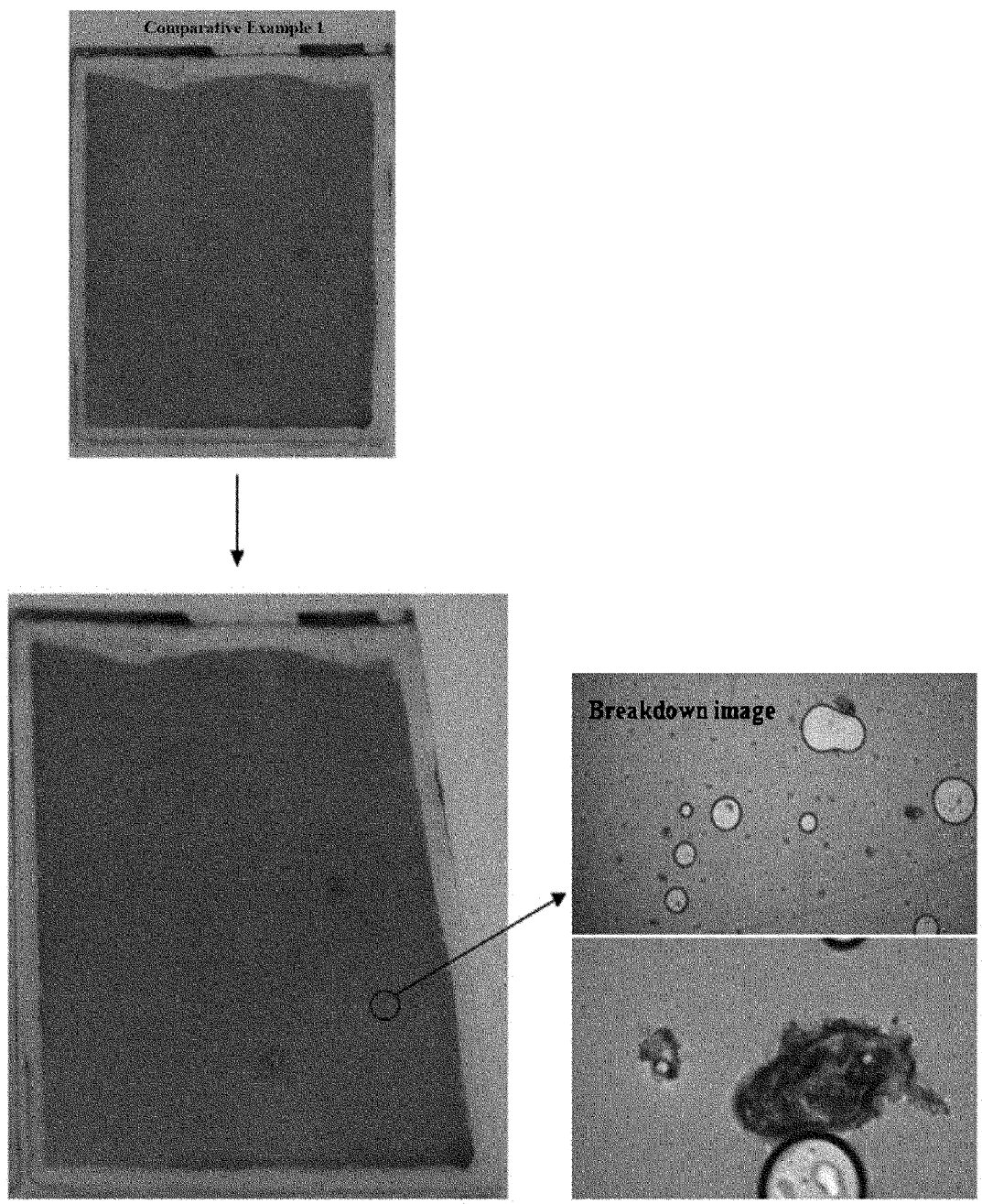

[Figure 15]
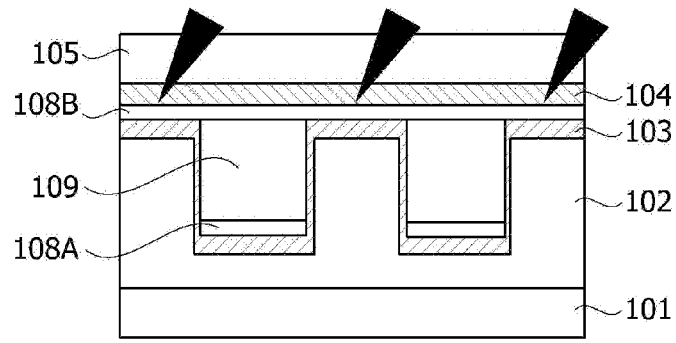
[Figure 16]
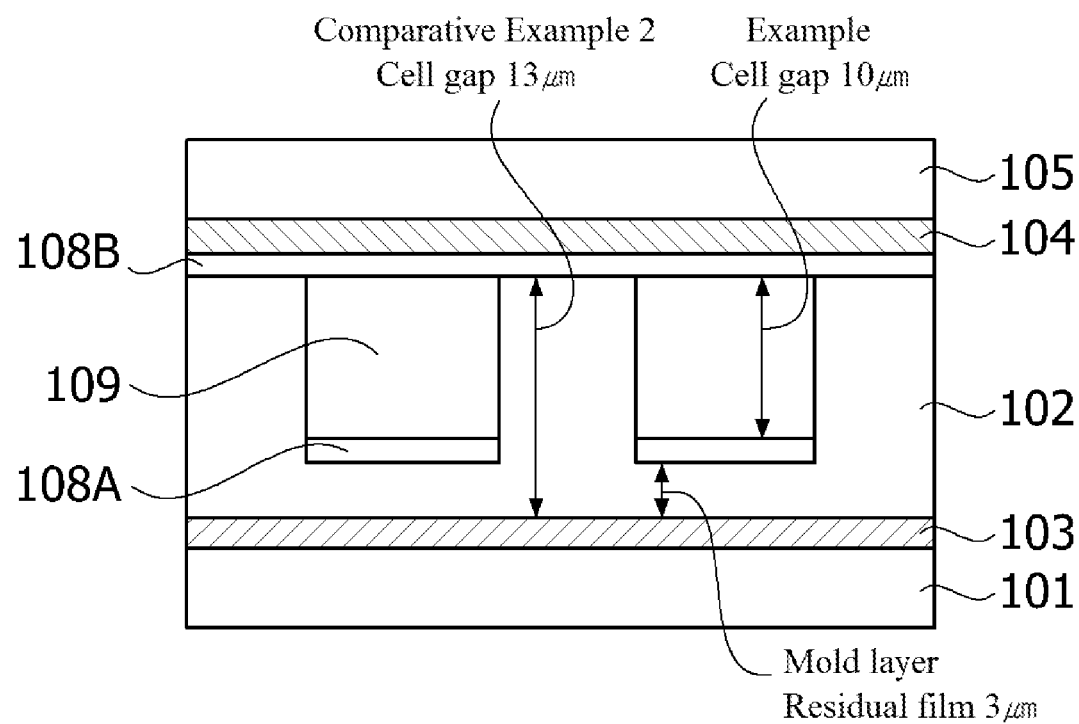

[Figure 17]
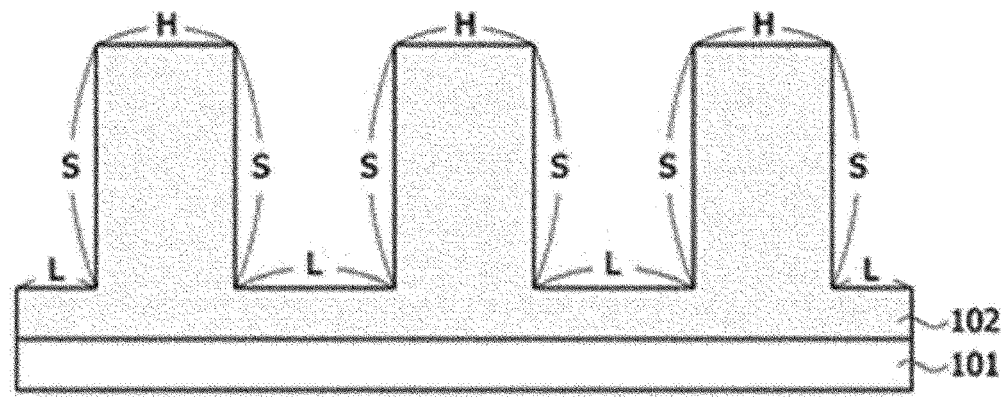
(A)
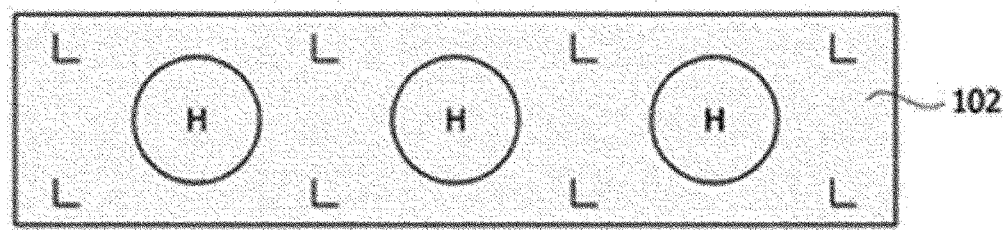
(B)
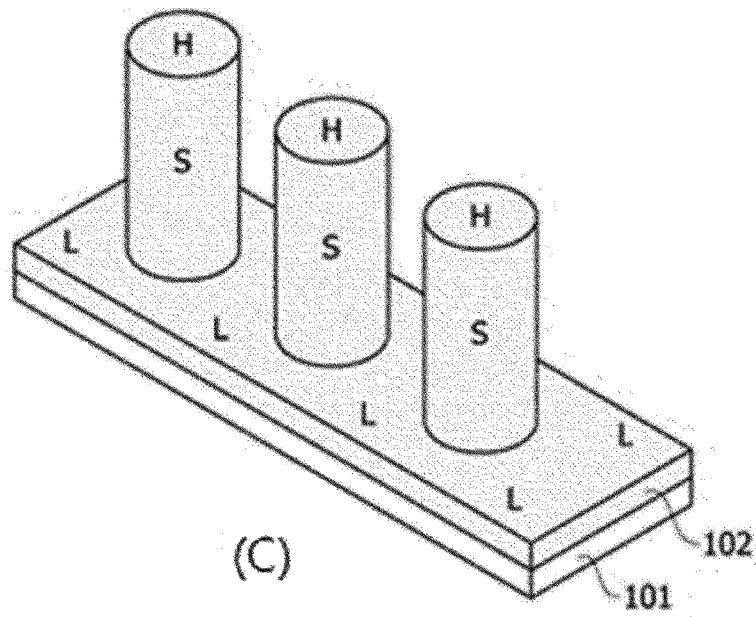
(C)

METHOD OF MANUFACTURING AN OPTICAL DEVICE

CROSS-REFERENCE TO RELATED APPLICATIONS

The present application is a national phase entry under 35 U.S.C. § 371 of International Application No. PCT/KR2016/010084 filed on Sep. 8, 2016, which claims priority from Korean Patent Application No. 10-2015-0126802 filed on Sep. 8, 2015, the disclosures of which are incorporated herein by reference in their entirety.

TECHNICAL FIELD

The present application relates to a method of manufacturing an optical device, an optical device and a use of the optical device.

BACKGROUND ART

Recently, display devices such as LCDs are being developed as flexible devices for reasons such as weight saving, design convenience and breakage prevention, and are also under review for being applied to a roll-to-roll process that is advantageous to low-cost mass production. In order to realize a flexible device and be applied to a roll-to-roll process, it is necessary to use a film-based flexible substrate, and in order to apply a flexible substrate to a display device such as an LCD, it is an important factor to maintain a cell gap of the upper and lower substrates and to bond them so that fluidity of liquid crystals can be prevented.

Non-Patent Document 1 ("Tight Bonding of Two Plastic Substrates for Flexible LCDs", SID Symposium Digest, 38, pp. 653-656 (2007)) discloses a technique comprising forming an organic film patterned in a pillar shape having a height of cell gap on one substrate and fixing it to the opposite substrate using an adhesive. When the imprinting process is applied on forming the above patterned organic film, the pillar pattern having the desired shape can be easily formed. In addition, in order to drive a display device such as an LCD, it is required to apply a voltage, whereby a film substrate coated with a transparent electrode film such as ITO can be used. In this case, there is a problem that after completion of the film cell the driving voltage increases by the residual film remaining even in a region other than the pillar shape in at least certain thickness on the imprinting process. Typically, when imprinting to have a pillar pattern with a thickness of about 10 μm, a residual film having a thickness of about 3 to 5 μm remains. In order to solve the above problem, a method of applying a photo patterning process other than the imprinting process, has been proposed so as to leave no residual film, but the photo patterning process has a disadvantage to be complicated over the imprinting process.

DISCLOSURE

Technical Problem

The present application provides a method of manufacturing an optical device, an optical device, and a use of the optical device.

Technical Solution

The present application relates to a method of manufacturing an optical device. In one example, the present application relates to a method of manufacturing an optical device comprising forming a patterned mold layer in a pillar shape on a lower base film; forming a lower electrode layer on the patterned mold layer; preparing a lower substrate by imparting an insulating property to the lower electrode layer; and laminating an upper substrate including an upper electrode layer and an upper base film on the lower substrate.

In the above manufacturing method, known materials of base films can be used without any particular limitation as the lower base film. For example, an inorganic film such as a glass film, a crystalline or amorphous silicon film, and a quartz or ITO (Indium Tin Oxide) film, or a plastic film or the like can be used, and the plastic film can be used in terms of realizing a flexible device.

As the plastic film, TAC (triacetyl cellulose); COP (cycloolefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (polyether sulfone); PEEK (polyetheretherketone); PPS (polyphenylsulfone); PEI (polyetherimide); PEN (polyethylenenaphthatate); PET (polyethyleneterephthalate); PI (polyimide); PSF (polysulfone); PAR (polyarylate) or an amorphous fluororesin can be used, but is not limited thereto.

On one side of the base film, a coating layer of gold, silver, or a silicon compound such as silicon dioxide or silicon monoxide, or a coating layer such as an antireflection layer may be also present, if necessary.

In the above manufacturing method, the patterned mold layer may include a curable resin. As the curable resin, a known curable resin can be used without any particular limitation. For example, as the curable resin, a thermosetting resin or a photo-curable resin can be used, but is not limited thereto. As the photo-curable resin, for example, an ultraviolet curing resin can be used, but is not limited thereto. As the thermosetting resin, for example, a silicone resin, a silicon resin, a furan resin, a polyurethane resin, an epoxy resin, an amino resin, a phenol resin, a urea resin, a polyester resin or a melamine resin may be used, but is not limited thereto. As the ultraviolet curing resin, typically, an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like can be used, but is not limited thereto.

The pillar shape of the patterned mold layer is present between the lower base film and the upper base film, and plays a role of maintaining a gap between the upper base film and the lower base film. The shape of the pillar pattern in the patterned mold layer is not particularly limited, as long as it is formed so as to maintain an appropriate gap between the lower base film and the upper base film.

That is, the height, area, spacing, shape, arrangement method and the like of the pillar pattern in the patterned mold layer are not particularly limited and can be appropriately adjusted within a range that does not impair the purpose of the present application.

In one example, the patterned mold layer may be patterned such that one or two or more pillar shapes are present at a distance or may be patterned such that partition-shaped pillars form compartments, without being limited thereto.

In addition, a cross section of the pillar shape is also not particularly limited, and for example, the pillar shape having a cross-section of cylinder, cylindroid, or other polygons can be applied without limitation. Furthermore, the shape of the compartment formed by the partition-shaped pillars can be applied without limitation so as to have a cross-section of a circular shape, an oval shape or other polygonal shapes.

In one example, considering the desired gap between the upper substrate and the lower substrate, the height of the pillar shape in the patterned mold layer can be appropriately adjusted within a range similar to the gap. In addition, the area ratio of the pillar shape in the patterned mold layer is associated with an adhesive force between the upper substrate and the lower substrate, which can be appropriately adjusted in consideration of the adhesive force between the upper substrate and the lower substrate.

In this specification, each region of the patterned mold layer in the pillar shape can be referred to as a top surface portion, a side surface portion and a bottom surface portion. FIG. 17 is a schematic diagram showing a top surface portion (H), a side surface portion (S) and a bottom surface portion (L) of a patterned mold layer (102) formed on a lower base film (101) (hereinafter, mold film). FIG. 17A is a view schematizing the front surface of the mold film, FIG. 17B is a view schematizing the top surface of the mold film, and FIG. 17C is a view schematizing the side surface of the mold film. That is, it can be seen that the pillar shape of the patterned mold layer in the pillar shape consists of the top surface portion (H) and the side surface portion (S), and the region other than the pillar shape, for example, the floor surface of the patterned mold layer can be referred to as the bottom surface portion (L).

The patterned mold layer may be patterned in the pillar shape by an imprinting process. Specifically, the imprinting process may be performed by a method that a coating layer of a curable resin composition is formed on the upper part of a lower base film and a patterned mold for imprinting capable of transferring a pillar shape pattern on the coating layer is contacted with the coating layer and then removed.

As the mold for imprinting, a mold for imprinting known in the art can be used without limitation, and for example, a soft mold can be used. As a material of the soft mold, a material of the soft mold known in the art can be applied, and for example, a flexible adhesive resin or PDMS (polydimethylsiloxane) can be used, but is not limited thereto.

In the imprinting method, a curing process for curing the curable resin composition may be further performed, for example, by applying appropriate energy for curing the curable resin composition, for example, through heat and/or light irradiation. The energy for curing can be, for example, ultraviolet. The application condition of energy for curing is not particularly limited as long as the curing process is carried out so that the curable resin composition can be properly cured. The irradiation of energy for curing can be performed, for example, before, simultaneously with, or after contacting the mold for imprinting with the curable resin composition. Also, even in the imprinting method, in order to easily separate the mold for imprinting from the coating layer of the curable resin composition, a release treatment may be performed for the mold for imprinting.

In a process of patterning the mold layer, when the imprinting process is applied, there is an advantage that the desired pillar shape can be simply patterned. However, when the imprinting process is applied, a residual film having at least certain thickness may remain in a region other than the pillar shape. For example, the thickness of the region where the pillar shape does not exist in the patterned mold layer, that is, the thickness of the residual film or the thickness of the bottom portion (floor surface) may be within a range of more than about 0% to less than 50% relative to the thickness of the pillar shape. In one example, when the mold layer is imprinted to have a pillar shape with a thickness of about 10 μm, a residual film with a thickness of about 3 μm to 5 μm may remain.

In the above manufacturing method, the lower electrode layer may be formed on the entire surface of the patterned mold layer. For example, the lower electrode layer may be formed on the top surface portion, the side surface portion, and a region without the pillar shape (the bottom surface portion), of the patterned mold layer. The lower electrode layer may be formed on the patterned mold layer by a known deposition method.

The lower electrode layer may be formed by, for example, depositing a conductive polymer, a conductive metal, a conductive nanowire, or a metal oxide such as ITO (Indium Tin Oxide). The lower electrode layer can be formed to have transparency. In this field, various materials capable of forming a transparent electrode layer and the methods for forming the same are known, and all the methods can be applied. If necessary, the lower electrode layer may be also appropriately patterned.

Unlike the above process, when the lower electrode layer is first formed on the base film and the patterned mold layer is formed on the lower electrode layer by a process such as imprinting, there is a problem that the driving voltage of the optical device is raised, because the residual film having at least certain thickness remains in a region other than the pillar shape. According to the manufacturing method of the present application, since the patterned mold layer is first formed on the base film by the imprinting process and the lower electrode layer is formed on the patterned mold layer, the problem raising the driving voltage can be solved.

The above manufacturing method includes the preparing the lower substrate by imparting the insulating property to the lower electrode layer. In this specification, the phrase "imparting an insulating property" may mean that an electric current between two conductors is electrically shielded so that it does not flow through. In one example, the insulation may mean the insulation between the lower electrode layer and the upper electrode layer.

In the case where the process of imparting the insulation property is not performed, there is a problem that when the upper electrode layer is laminated on the lower electrode layer formed on the patterned mold layer a short circuit phenomenon occurs. According to the manufacturing method of the present application, it is possible to solve the short circuit problem between the lower electrode layer and the upper electrode layer through the process of imparting an appropriate insulating property to the lower electrode layer.

The process of imparting the insulating property can be performed by the processes according to first to third embodiments below. FIGS. 1 to 3 are schematic diagrams of methods of manufacturing an optical device according to the first to third embodiments, respectively.

In the first embodiment, the process of imparting the insulating property to the lower electrode layer can be performed by a process of removing the lower electrode layer at the side surface portion of the pillar shape in the patterned mold layer. That is, as shown in FIG. 1, the manufacturing method comprises steps of forming a mold layer (102) patterned in a pillar shape on a lower base film (101); forming a lower electrode layer (103) on the patterned mold layer (102); removing the lower electrode layer (103) at the side surface portion of the pillar shape in the patterned mold layer (102) to manufacture a lower substrate; and laminating an upper substrate including an upper electrode layer (104) and an upper base film (105) on the lower substrate.

In the first embodiment, the insulating region may mean a region where the lower electrode layer is removed from the side surface portion of the pillar shape in the patterned mold layer. The process of removing the lower electrode layer from the side surface portion of on the pillar shape in the patterned mold layer may be performed, for example, by a wet etching process. When the lower electrode layer is formed on the patterned mold layer by a process such as deposition, the electrode layer having a relatively thin thickness is formed on the side surface portion of the pillar shape, compared with the other portions, for example, the top surface portion of the pillar shape or the regions other than the pillar shape. Therefore, the electrode layer of the side surface portion, having the relatively thin thickness, can be first removed through wet etching.

In addition, the electrode layer may be also patterned through the process of imparting an insulating property in the first embodiment. FIG. 4 is a schematic diagram of a process of forming an electrode layer patterned in a stripe shape through the process of imparting an insulating property in the first embodiment. As shown in FIG. 4, when an electrode layer (indicated by a dotted pattern) is formed on the entire surface of a mold layer patterned in a stripe shape and wet etching is performed as in the first embodiment, the electrode layer of the side surface portion may be selectively removed to form the electrode layer patterned in a stripe shape having line patterns.

Furthermore, in the second embodiment, the process of imparting the insulating property to the lower electrode layer can be performed by a process of removing the lower electrode layer from the top surface portion of the pillar shape in the patterned mold layer. In the second embodiment, the insulating region may mean a region where the lower electrode layer is removed from the top surface portion of the pillar shape in the patterned mold layer.

The process of removing the lower electrode layer from the top surface portion of the pillar shape in the patterned mold layer may be performed by a transfer process using a pressure sensitive adhesive. Specifically, the transfer process using a pressure sensitive adhesive may be performed by a process of attaching a pressure sensitive adhesive to the lower electrode layer of the top surface portion of the pillar shape in the patterned mold layer and then detaching it. In this case, the lower electrode layer of the top surface portion of the pillar shape is transferred to the pressure sensitive adhesive, whereby it can be removed. Here, only the lower electrode layer of the top surface portion of the pillar shape may be also selectively removed, and a part of the lower electrode layer of the side surface portion connected to the lower electrode layer of the top surface portion may be also removed.

As the pressure sensitive adhesive, pressure sensitive adhesives (PSAs) known in the art can be used. For example, known pressure sensitive adhesives such as acrylic pressure sensitive adhesives, silicone pressure sensitive adhesives, rubber pressure sensitive adhesives, and urethane pressure sensitive adhesives can be used without any particular limitation. According to one embodiment of the present application, an acrylic pressure sensitive adhesive may be used, but is not limited thereto. In addition, the thickness of the pressure sensitive adhesive can be appropriately adjusted within a range in which the electrode layer of the top surface portion of the pillar shape can be transferred and removed. For example, the pressure sensitive adhesive may have a thickness smaller than the thickness of the pillar shape. If the thickness of the pressure sensitive adhesive is similar to the thickness of the pillar shape, the regions other than the pillars, that is, the electrode layer of the floor surface in the patterned mold layer as well as the top surface of the pillar shape will be concernedly removed. In one example, the pressure sensitive adhesive may have a thickness range of about 50% or less relative to the thickness of the pillar shape, but is not limited thereto.

FIG. 2 is a schematic diagram of a method of manufacturing an optical device according to the second embodiment. As shown in FIG. 2, the manufacturing method comprises steps of forming a mold layer (102) patterned in a pillar shape on a lower base film (101); forming a lower electrode layer (103) on the patterned mold layer (102); attaching a pressure sensitive adhesive (106) to the lower electrode layer (103) of the top surface portion of the pillar shape in the patterned mold layer (102) and then detaching it to manufacture a lower substrate; and laminating an upper substrate including an upper electrode layer (104) and an upper base film (105) on the lower substrate.

In addition, the electrode layer may be also patterned through the process of imparting an insulating property in the second embodiment. FIG. 5 is a schematic diagram of the process of forming an electrode layer patterned in a stripe shape through the process of imparting an insulating property in the second embodiment. As shown in FIG. 5, when an electrode layer (indicated by a dotted pattern) is formed on the entire surface of a mold layer patterned in a stripe shape and a pressure sensitive adhesive is attached to the top surface portion of the electrode layer and then detached as in the second embodiment, the electrode layer of the top surface portion may be selectively removed to form the electrode layer patterned in a stripe shape having line patterns.

Besides, in the third embodiment, the process of imparting the insulating property to the lower electrode layer may be performed by a process of forming an insulating layer on the lower electrode layer. In addition to this, the insulating layer may be also formed on the upper electrode layer, that is, on the opposite surface of the upper electrode layer on which the upper base film is formed, but is not essential.

FIG. 3 is a schematic diagram of a method of manufacturing an optical device according to the third embodiment in which insulating layers are formed on the lower and upper electrode layers. As shown in FIG. 3, the manufacturing method comprises steps of forming a mold layer (102) patterned in a pillar shape on a lower base film (101); forming a lower electrode layer (103) on the patterned mold layer (102); forming an insulating layer (107A) on the lower electrode layer (103) to manufacture a lower substrate; and laminating an upper substrate including an insulating layer (107B), an upper electrode layer (104), and an upper base film (105) on the lower substrate.

In the third embodiment, the insulating region may mean the insulating layer. The thickness of the insulating layer can be suitably selected within a range that does not impair the purpose of the present application. For example, the thickness of the insulating layer may be within the range of about 0.3 μm to 1.0 μm, but is not limited thereto.

As the insulating layer, known insulating materials can be used. For example, as the insulating layer, non-conductive materials can be used without limitation. Specifically, the used non-conductive materials may include a metal such as In, Sn, Pb, Au, Cu, Ag, Al, Ti and Ni; a metal oxide such as TiO, $TiO_2$, $Ti_3O_3$, $Al_2O_3$, MgO, SiO, $SiO_2$, GeO, NiO, CaO, BaO, $Fe_2O_3$, $Y_2O_3$, $ZrO_2$, $Nb_2O_3$ and $CeO_2$; a metal nitride such as SiN; a metal oxynitride such as SiON; a metal fluoride such as $MgF_2$, LiF, $AlF_3$ and $CaF_2$; polyethylene, polypropylene, polymethyl methacrylate, polyimide, poly-urea, polytetrafluoroethylene, polychlorotrifluoroethylene, polydichlorodifluoroethylene, or a copolymer of chlorotrifluoroethylene and dichlorodifluoroethylene; a copolymer obtained by copolymerizing tetrafluoroethylene with a comonomer mixture comprising at least one comonomer; a fluorine-containing copolymer having a cyclic structure in a copolymerized main chain; an absorbent material having an absorption rate of 1% or more; and a moisture-proof material having an absorption coefficient of 0.1% or less.

In another example, as the insulating layer, an alignment film can be used. As the alignment film, an alignment film known in the art can be applied without limitation, and for example, a contact type alignment film such as a rubbing alignment film or an alignment film, including a photo-alignment film compound, known to be capable of showing an orientation characteristic by a non-contact method such as irradiation of a linearly polarized light can be used, but is not limited thereto. As the alignment film, a vertical alignment film or a horizontal alignment film can also be used. Since the alignment film can perform a function to align adjacent liquid crystals, when an intermediate layer includes liquid crystals, as described below, the vertical alignment film or the horizontal alignment film may be appropriately selected and used in consideration of the desired initial alignment state of liquid crystals. In one example, the alignment film may be formed to a thickness of about 0.5 μm, but is not limited thereto. Even in the case of using the alignment film as the insulating layer, the insulating layer may be formed only on the lower electrode layer or may be additionally formed on the upper electrode layer, if necessary.

The manufacturing method comprises a step of laminating the upper substrate including the upper electrode layer and the upper base film on the lower substrate. For the details of the upper base film, the content described in the item of the lower base film may be equally applied. In addition, for the details of materials of the upper electrode layer, the content described in the item of the upper electrode layer may be equally applied.

The upper substrate may be laminated such that the upper electrode layer faces the top surface portion of the pillar shape in the patterned mold layer. In this case, according to the first to the third embodiments for imparting an insulating property to the lower electrode layer, the region in which the upper electrode layer encounters may be different. For example, in the case of the first embodiment, as shown in FIG. 1, the process of laminating the upper substrate can be performed by laminating the upper electrode layer of the upper substrate so as to encounter the lower electrode layer of the top surface portion of the pillar shape in the patterned mold layer. Furthermore, in the case of the second embodiment, as shown in FIG. 2, the process of laminating the upper substrate can be performed by laminating the upper electrode layer so as to encounter the top surface portion of the pillar shape in the patterned mold layer. Moreover, in the case of the third embodiment, as shown in FIG. 3, the process of laminating the upper substrate can be performed by laminating the upper electrode layer so as to encounter the insulating layer of the top surface portion of the pillar shape in the patterned mold layer of the lower substrate.

The manufacturing method may further comprise a process of forming an alignment film on the patterned mold layer and/or the lower electrode layer after the process of imparting the insulating property to the lower electrode layer. In addition, the manufacturing method may further comprise a process of forming an alignment film on the upper part of the upper electrode layer. In this case, the initial alignment state of liquid crystals can be adjusted by the alignment film, when an intermediate layer to be described below is a liquid crystal layer. Furthermore, when the insulating layer in the process of imparting an insulating property, as in the third embodiment, is an alignment film, the process of forming the alignment film may not be further performed.

The manufacturing method may further comprise a step of forming an intermediate layer between the upper substrate and the lower substrate after the step of laminating the upper substrate. The space between the upper substrate and the lower substrate may be a space formed by regions other than the pillar shape of the patterned mold layer. The term "intermediate layer" herein may mean a layer positioned between the upper and lower substrates of the optical device and formed so as to be capable of transmitting or blocking light, or emitting light, depending on whether or not external action is applied.

The term "external action" may mean all the external factors, such as an external voltage, that may affect behavior of a material contained in the intermediate layer, for example, a light modulating material or a light emitting material. Therefore, a state without external action may mean a state in which no external voltage or the like is applied.

The intermediate layer and the substance included therein may vary specific kinds thereof in accordance with the driving mode and principle of the display device. In one example, the intermediate layer may be a light modulating layer containing a light modulating material or a light emitting layer containing a light emitting material.

In one example, the intermediate layer may be a light modulating layer. In the present application, the "light modulating layer" may mean a layer comprising a light modulating material capable of transmitting or blocking light depending on whether or not external action is applied. In one example, the light modulating layer may be, but is not limited to, a liquid crystal layer, an electrochromic material layer, a photochromic material layer or an electrophoretic material layer or a dispersed particle orientation layer. Hereinafter, a specific example of the above illustrated light modulating layer will be explained, but the constitution of the light modulating layer is not limited to the following, and the contents known in the art relating to the light modulating layer may be applied to the present application without limitation.

The liquid crystal layer is a layer containing a liquid crystal compound. The liquid crystal compound may be present in the liquid crystal layer so that the orientation direction changes depending on whether or not external action is applied. As the liquid crystal compound, any kind of liquid crystal compound can be used as far as the orientation direction can be changed by application of external action. For example, as the liquid crystal compound, a smectic liquid crystal compound, a nematic liquid crystal compound, or a cholesteric liquid crystal compound can be used. In addition, the liquid crystal compound may be, for example, a compound which does not have a polymerizable group or a crosslinkable group, so that the orientation direction thereof can be changed by application of external action. As the driving mode of the liquid crystal layer, for example, a DS (dynamic scattering) mode, an IPS (in-plane switching) mode, a VA (vertical alignment) mode, a TN (twisted nematic) mode or a STN (super twisted nematic) mode can be applied, but is not limited thereto, and any driving mode of the liquid crystal layer known in the art can be applied.

In one example, the liquid crystal layer may be a polymer network liquid crystal layer. The polymer network liquid crystal layer is a superordinate concept including a so-called polymer dispersed liquid crystal layer or polymer stabilized liquid crystal layer. The polymer network liquid crystal layer may include, for example, a polymer network and a liquid crystal region including a liquid crystal compound dispersed in a state of being separated from the polymer network. Here, the liquid crystal compound may be present in the polymer network such that the orientation is switchable. The polymer network may be a polymer network of a precursor comprising a polymerizable or crosslinkable compound, and the polymerizable or crosslinkable compound may form the polymer network in a polymerized stat or a crosslinked state. As the polymerizable or crosslinkable compound, for example, a compound having a (meth)acryloyl group can be used, but is not limited thereto.

In another example, the liquid crystal layer may be a pixel-isolated liquid crystal layer (PILC). The pixel-isolated liquid crystal layer means a liquid crystal layer in which a barrier structure for maintaining a cell gap is introduced for each pixel. The pixel-isolated liquid crystal layer may include a liquid crystal compound whose the aligned direction can be changed by a signal applied by the outside. The pixel-isolated liquid crystal layer can also control light transmittance by using the aligned state of the liquid crystal compound.

The electrochromic material layer uses, for example, a phenomenon that the light transmittance of the electrochromic material is changed by an electrochemical redox reaction. The electrochromic material may be not colored in a state in which an electrical signal is not applied and be colored in a state in which an electrical signal is applied, so that light transmittance can be controlled.

The photochromic material layer can vary the light transmittance by using, for example, a phenomenon in which the binding state of the photochromic material changes and the color changes (reversibly) when light of a specific wavelength is irradiated. In general, the photochromic material is colored when exposed to ultraviolet, and has the original pale color when irradiated with visible light, but is not limited thereto.

The electrophoretic material layer can vary the light transmittance by, for example, a combination of a medium liquid and an electrophoretic material. In one example, as the electrophoretic material, particles having a positive (+) or negative (−) charge and having a color can be used, and the light transmittance can be controlled by a method that the electrophoretic particles are rotated or moved near to an electrode with different polarity, according to the voltage applied to two electrodes present in the upper and lower parts of the electrophoretic material layer, to represent colors, but is not limited thereto.

The dispersed particle orientation layer includes, for example, a structure in which a thin film laminate of nano-sized, rod-shaped particles is suspended in liquid crystals. In the dispersed particle orientation layer, for example, the suspended particles may exist in a state they are not arranged in a state where an external signal is not applied to block and absorb light, and be arranged in a state where an external signal is applied to transmit light, but is not limited thereto.

The light modulating layer may further comprise a dichroic dye in terms of adjusting the light transmittance variable characteristics. In this specification, the term "dye" may mean a material capable of intensively absorbing and/or modifying light in at least some or all of the range within a visible light region, for example, a wavelength range of 400 nm to 700 nm, and the term "dichroic dye" may mean a material capable of anisotropically absorbing light in at least some or all of the range of the visible light region. As the dichroic dye, for example, a black dye can be used. Such a dye is known, for example, as an azo dye or an anthraquinone dye, but is not limited thereto.

The present application also relates to an optical device. In one example, the present application relates to an optical device comprising a lower substrate including a lower base film; a patterned mold layer in a pillar shape on the lower base film; and a lower electrode layer formed on the patterned mold layer; and an upper substrate laminated on the lower substrate and including an upper electrode layer and an upper base film, wherein the lower electrode layer and the upper electrode layer are present in an insulated state. The optical device can be manufactured by the above manufacturing method.

Here, the state in which the lower electrode layer and the upper electrode layer are insulated may mean a state in which a short circuit phenomenon does not occur when a predetermined voltage is applied through the lower electrode layer and the upper electrode layer. According to one embodiment of the present application, when a voltage of about 60 V is applied through the lower electrode layer and the upper electrode layer, the state in which the short circuit phenomenon occurs can be regarded as a non-insulated state, but the voltage range is not necessarily limited to thereto.

For the details of the lower base film, the patterned mold layer, the lower electrode layer, the upper electrode layer, and the upper base film in the optical device, the contents described in the item of the manufacturing method of the optical device can be equally applied. In addition, for the configurations other than the above-described configuration, the contents described in the item of the manufacturing method of the optical device can be also equally applied.

The lower electrode layer is formed on the upper part of the patterned mold layer, and thus the optical device may solve the problem that the driving voltage increases. In addition, the optical device does not cause a short circuit phenomenon because the lower electrode layer and the upper electrode layer are present in an electrically insulated state.

In the optical device, the state in which the lower electrode layer and the upper electrode layer are electrically insulated is realized by the following first to third embodiments.

In the first embodiment, the optical device may be present in a state in which the lower electrode layer of the side surface portion of the pillar shape in the patterned mold layer is removed. For the details, the contents described in the item of the first embodiment of the manufacturing method of the optical device can be equally applied. Therefore, the optical device of the first embodiment can be exemplified by the optical device shown at the bottom of FIG. 1.

In the second embodiment, the optical device may be present in a state in which the lower electrode layer of the top surface portion of the pillar shape in the patterned mold layer is removed. For the details, the contents described in the item of the second embodiment of the manufacturing method of the optical device can be equally applied. Therefore, the optical device of the second embodiment can be exemplified by the optical device shown at the lowest part of FIG. 2.

In the third embodiment, the optical device may further comprise an insulating layer formed on the lower electrode layer. For the details, the contents described in the item of the third embodiment of the manufacturing method of the optical device can be equally applied. Therefore, the optical device of the third embodiment can be exemplified by the optical device shown at the lowest part of FIG. 3.

The optical device may further comprise a light modulating layer or a light emitting layer existing between the upper substrate and the lower substrate. For the details, the contents described in the item of the light modulation layer or the light emitting layer of the intermediate layer of the manufacturing method of the optical device can be equally applied.

The present application also relates to a use of the optical device. The optical device of the present application can be realized as a flexible device, since the upper substrate and the lower substrate can be present in a state attached to each other while maintaining an appropriate gap using the patterned mold layer, and is also advantageously applied to a roll-to-roll process after manufacturing it.

Such an optical device may be included in various display devices and used. The display device may be, for example, an electroluminescence display (ELD), a liquid crystal display device (LCD), an electrochromic display (ECD), a photochromic display (PCD), an electrophoretic image display (EPD), a suspended particle display (SPD), or the like. The method of constituting the display device is not particularly limited, and a conventional method can be applied as long as the optical device is used.

Advantageous Effects

The method of manufacturing an optical device of the present application can form a patterned mold layer to maintain an appropriate gap between the upper and lower substrates, and can apply an imprinting process in patterning the mold layer to simply manufacture the mold pattern having the desired shape. In addition, the optical device manufactured by the above manufacturing method can have a low driving voltage and no short circuit phenomenon, and be realized as a flexible device. Such an optical device can be applied to various display devices such as LCDs.

BRIEF DESCRIPTION OF DRAWINGS

FIG. 1 is a schematic diagram of a method of manufacturing an optical device according to the first embodiment.

FIG. 2 is a schematic diagram of a method of manufacturing an optical device according to the second embodiment.

FIG. 3 is a schematic diagram of a method of manufacturing an optical device according to the third embodiment.

FIG. 4 is a schematic diagram of a method of forming a patterned electrode layer according to the first embodiment.

FIG. 5 is a schematic diagram of a method of forming a patterned electrode layer according to the second embodiment.

FIG. 6 is a schematic diagram of the optical device of Example 1.

FIG. 7 is a schematic diagram of the optical device of Example 2.

FIG. 8 is a schematic diagram of the optical device of Example 3.

FIG. 9 is a schematic diagram of the optical device of Comparative Example 1.

FIG. 10 is a schematic diagram of the optical device of Comparative Example 2.

FIG. 11 shows the results evaluating the total transmittance according to the voltages of the optical devices of Examples 1 to 3 and Comparative Examples 1 to 2.

FIG. 12 shows the results evaluating haze according to the voltages of the optical devices of Examples 1 to 3 and Comparative Examples 1 to 2.

FIG. 13 is images of the OFF state after driving the optical devices of Examples 1 to 3 and Comparative Examples 1 to 2.

FIG. 14 is an image enlarging the image of the OFF state after driving the optical device of Comparative Example 1.

FIG. 15 is a schematic diagram of a shot circuit phenomenon of the optical device of Comparative Example 1.

FIG. 16 is a schematic diagram for comparing the cell gaps of the optical devices of Examples and Comparative Example 2.

FIG. 17 is a schematic diagram showing the top surface portion (H), the side surface portion (S) and the bottom surface portion (L) of a mold film.

MODE FOR INVENTION

Hereinafter, the optical device will be described in more detail through examples according to the present application, but the scope of the present application is not limited to examples set forth below.

Example 1

An optical device having the structure of FIG. 6 was manufactured by applying the process schematic diagram of FIG. 1. First, a curable resin composition was coated on the upper part of a PET (polyethylene terephthalate) film (101) (width×length=100 mm×100 mm) (hereinafter, referred to as a lower base film) and then a mold layer (102), which was patterned to have a cylindrical shape by an imprinting process, was formed. As the curable resin, a polyester acrylate polymer was used. The patterned mold layer had a cylindrical height of 10 μm, a cylindrical diameter of 15 μm, a gap between the cylinders of 150 μm, and a residual film thickness in a region other than the cylinder of about 3 μm.

Next, an ITO (indium tin oxide) layer (103) was deposited to a thickness of about 70 nm on the upper part of the patterned mold layer.

Next, in order to impart an insulating property, oxalic acid was diluted to about 1%, and then the film of the patterned mold layer, on which the ITO layer was deposited, was immersed for about 2 minutes to wet etch the ITO layer of the side surface portion of the pillar pattern, followed by carrying out the washing and drying process.

Next, a vertical alignment film (5661, Nissan Chemical Co.) (108A) was formed on the upper part of the ITO layer of the film of the patterned mold layer having the ITO layer deposited thereon (hereinafter, referred to as a lower substrate), and a vertical alignment film (108B) (5661, Nissan Chemical Co.) was formed on the upper part of an ITO layer of a PET (polyethylene terephthalate) film (105) on which an ITO (indium tin oxide) layer (104) as prepared separately was deposited (hereinafter, referred to as an upper substrate).

Next, an optical device was manufactured by squeezing-laminating a DSM (Dynamic Scattering Mode) liquid crystal composition (109) between the lower substrate and the upper substrate. As the DSM liquid crystal composition, a dye-liquid crystal composition mixing a liquid crystal compound (HCM009, HCCH Co.), an anisotropic dye (X12, BASF Co.) and MAT-13-1422 (refractive index anisotropy:

0.153, dielectric constant anisotropy: −5.0, Merck Co.) in a weight ratio of HCM009:X12:MAT-13-1422=10:1.0:90 was used.

Example 2

An optical device having the structure of FIG. 7 was manufactured by applying the process schematic diagram of FIG. 2. Specifically, the optical device of Example 2 was manufactured in the same manner as Example 1, except that the ITO layer of the top surface portion of the pillar pattern of the film in the patterned mold layer on which the ITO layer was deposited, was removed by a transfer process using a pressure sensitive adhesive (Acrylic PSA, LGC Co.), instead of the wet etching process for imparting the insulation property. Specifically, the transfer process using the pressure sensitive adhesive was performed by attaching the pressure sensitive adhesive having a thickness of about 5 μm to the top surface portion of the pillar pattern of the film in the patterned mold layer on which the ITO layer was deposited, and then detaching the pressure sensitive adhesive.

Example 3

An optical device having the structure of FIG. 8 was manufactured by applying the process schematic diagram of FIG. 3. Specifically, the optical device of Example 3 was manufactured in the same manner as Example 1, except that a vertical alignment film (5661, Nissan Chemical Co.) having a thickness of about 500 nm was formed on the upper part of the ITO layer of the film in the patterned mold layer on which the ITO layer was deposited, instead of the wet etching process for imparting the insulating property, and the process of forming the vertical alignment film (5661, Nissan Chemical Co.) on the upper part of the ITO layer of the film in the patterned mold layer, on which the ITO layer was deposited, after the wet etching process was not performed.

Comparative Example 1

An optical device having the structure of FIG. 9 was manufactured. Specifically, the optical device of Comparative Example 1 was manufactured in the same manner as Example 1, except that the wet etching process for imparting the insulating property was not performed.

Comparative Example 2

An optical device having the structure of FIG. 10 was manufactured. Specifically, the optical device of Comparative Example 2 was manufactured in the same manner as Example 1, except that the lower substrate was prepared by forming an ITO layer on the upper part of a PET lower base film, forming a patterned mold layer on the upper part of the ITO layer, and forming a vertical alignment film on the upper part of the patterned mold layer.

Evaluation Example 1: Evaluation of Total Transmittance and Haze According to Voltage Total transmittance and haze of the optical devices prepared in Examples and Comparative Examples were evaluated according to the voltages, and the results were shown in FIGS. 11 and 12, respectively. Specifically, while connecting an AC power to the upper and lower ITO layers of the optical device and driving it, transmittance and haze according to the applied voltage were measured using a haze meter (NDH-5000SP). In addition, FIG. 13 shows images of the OFF state after driving the optical devices of Examples 1 to 3 and Comparative Examples 1 and 2.

As a result of evaluation, the optical devices of Examples 1 to 3 exhibited similar characteristics and were stably driven.

However, in the optical device of Comparative Example 1, when a voltage of 60 V was applied, a short circuit occurred and the voltage is no longer applied. FIG. 14 is an enlarged image of the OFF state after driving the optical device of Comparative Example 1, and FIG. 15 shows a schematic diagram of the short circuit phenomenon of the optical device of Comparative Example 1. In Comparative Example 1, insulation between the upper and lower ITO layers is not perfectly formed, and thus if at least certain voltage is applied, upper and lower short circuits occurs, as current flows and a phenomenon that the mold layer breaks down occurs.

Also, in Comparative Example 2, the driving voltage increased, and thus saturation did not occur even when a voltage of 100 V was applied. FIG. 16 is a schematic diagram for comparing the cell gaps of the optical devices of Examples and Comparative Example 2. In Comparative Example 2, since the imprinting process of the mold layer was performed after forming the ITO layer on the upper part of the PET base film, a residual film of about 3 μm was present between the upper and lower ITO layers. Therefore, in Comparative Example 2, the driving voltage also increases in accordance with the effect of increasing the cell gap of about 3 μm which is the thickness of the residual film (cell gap 13 μm in Comparative Example 2), compared with the cell gap (10 μm) of Examples 1 to 3.

DESCRIPTION OF REFERENCE NUMERALS

101: lower base film
102: patterned mold layer
H: top surface portion, S: side surface portion, L: bottom surface portion
103: lower electrode layer
104: upper electrode layer
105: upper base film
106: pressure sensitive adhesive
107A, 107B: insulating layer
108A, 108B: alignment film
109: liquid crystal composition

The invention claimed is:
1. A method of manufacturing an optical device comprising:
forming a patterned mold layer in a pillar shape on a lower base film;
forming a lower electrode layer on the patterned mold layer;
preparing a lower substrate by imparting an insulating property to the lower electrode layer by a process of removing the lower electrode layer of a side surface portion of the pillar shape in the patterned mold layer; and
laminating an upper substrate including an upper electrode layer and an upper base film on the lower substrate,
wherein the laminating the upper substrate is performed by laminating the upper electrode layer so as to encounter the lower electrode layer of a top surface portion of the pillar shape in the patterned mold layer.

2. The method of manufacturing an optical device according to claim 1, wherein the patterned mold layer comprises a curable resin.

3. The method of manufacturing an optical device according to claim 1, wherein the patterned mold layer is patterned in the pillar shape by an imprinting process.

4. The method of manufacturing an optical device according to claim 1, wherein a thickness of a region where the pillar shape does not exist in the patterned mold layer is within a range of more than 0% to less than 50% relative to a thickness of the pillar shape.

5. The method of manufacturing an optical device according to claim 1, wherein the lower or upper electrode layer is a transparent electrode layer.

6. The method of manufacturing an optical device according to claim 1, wherein the process of removing the lower electrode layer of the side surface portion of the pillar shape in the patterned mold layer is performed by a wet etching process.

7. The method of manufacturing an optical device according to claim 1, further comprising forming an intermediate layer including a light modulating layer or a light emitting layer between the upper substrate and the lower substrate after the laminating the upper substrate.

8. The method of manufacturing an optical device according to claim 1, wherein the pillar shape of the patterned mold layer consists of a top surface portion and the side surface portion, and the patterned mold layer has a bottom surface portion which is a region other than the pillar shape.

9. The method of manufacturing an optical device according to claim 1, wherein the lower electrode layer is formed on an entire surface of the patterned mold layer.

10. The method of manufacturing an optical device according to claim 1, wherein the pillar shape of the patterned mold layer is present between the lower base film and the upper base film and maintains a gap between the upper base film and the lower base film.

11. An optical device comprising:
a lower substrate including a lower base film, a patterned mold layer in a pillar shape on the lower base film, and a lower electrode layer on the patterned mold layer; and
an upper substrate laminated on the lower substrate, wherein the upper substrate includes an upper electrode layer and an upper base film,
wherein the lower electrode layer and the upper electrode layer are in an electrically insulated state in which a side surface portion of the pillar shape of the lower electrode layer in the patterned mold layer is removed,
wherein the upper electrode layer encounters the lower electrode layer of a top surface portion of the pillar shape in the patterned mold layer.

12. The optical device according to claim 11, further comprising an intermediate layer including a light modulating layer or a light emitting layer between the upper substrate and the lower substrate.

13. A display device comprising the optical device of claim 11.

* * * * *